(Model.)
H. F. W. KOEHLER.
Wagon Step.
No. 242,939.   Patented June 14, 1881.
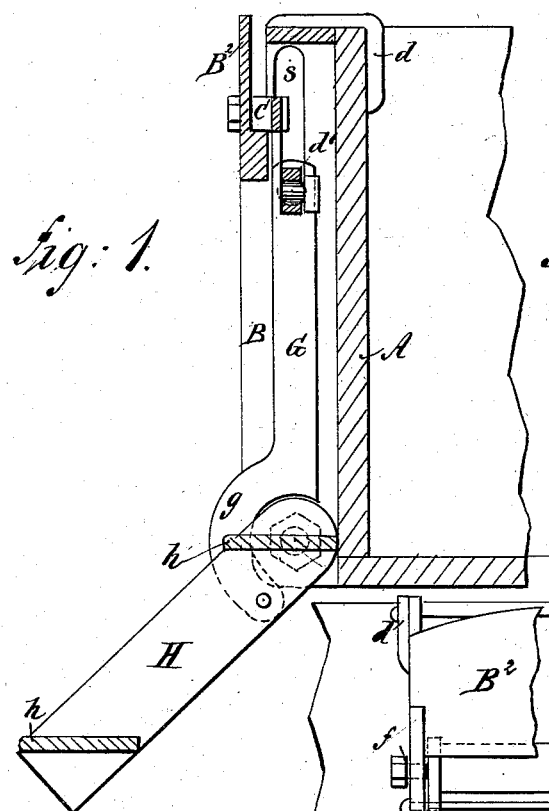
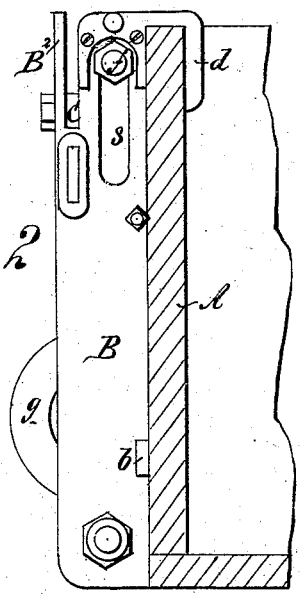
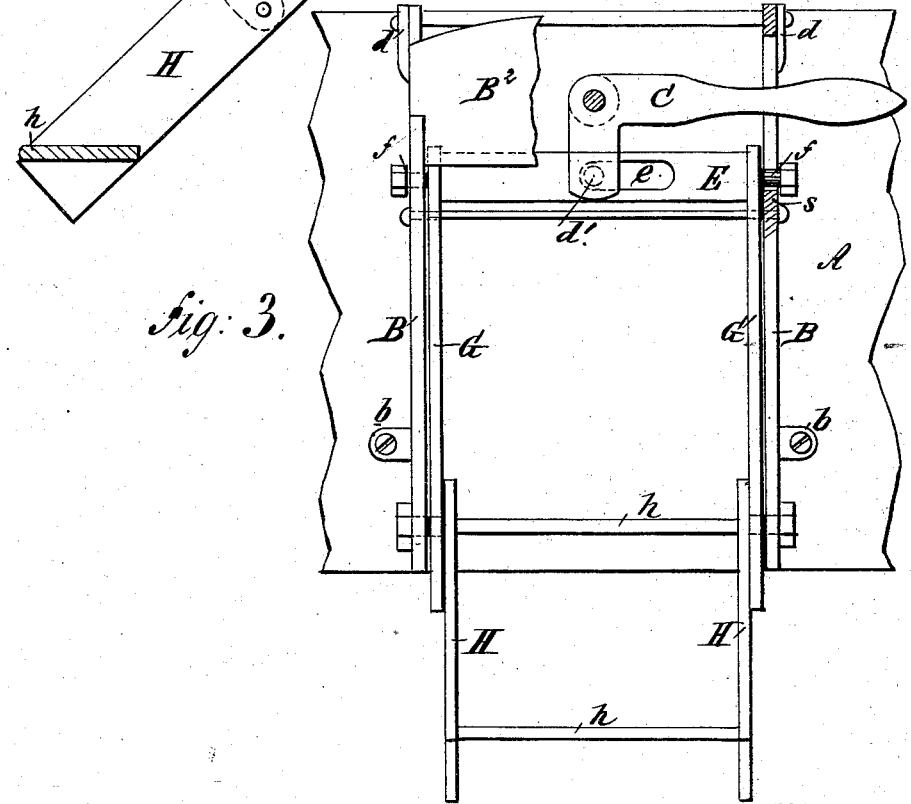
WITNESSES:
A. Schehl
C. Sedgwick
INVENTOR:
H. F. W. Koehler
BY Munn & Co.
ATTORNEYS.

UNITED STATES PATENT OFFICE.

HENRY F. W. KOEHLER, OF ST. JOSEPH, MISSOURI.

WAGON-STEP.

SPECIFICATION forming part of Letters Patent No. 242,939, dated June 14, 1881.

Application filed April 13, 1881. (Model.)

*To all whom it may concern:*

Be it known that I, HENRY F. W. KOEHLER, of St. Joseph, in the county of Buchanan and State of Missouri, have invented a new and useful Improvement in Wagon-Steps, of which the following is a full, clear, and exact description.

My invention relates to a means for enabling a person to enter or leave a wagon without the necessity for stepping on the hub or other portion of one of the wheels.

The invention is more particularly intended for use in connection with wagons such as are commonly used by farmers, but it is applicable to vehicles of various kinds.

The invention consists in a novel construction, arrangement, and combination of a cam-lever, a slotted cross-bar, two connecting-bars, and a step or steps, all arranged in a frame attached to the wagon-body, whereby provision is made for lowering the steps for use or turning it up out of the way by moving the lever in one direction or the other.

In the accompanying drawings, Figure 1 is a vertical sectional view of my invention, showing the step in position for use. Fig. 2 is a side view of the same with the step folded and not in use. Fig. 3 is a front view with the step down ready for use.

A represents a portion of the body of a wagon or vehicle of any ordinary description.

B is a frame, adapted to be attached to the side of a vehicle-body. It consists of two vertical bars connected at their upper ends by a cross-bar. The vertical bars are provided with lateral lugs $b$, and the cross-bar is provided with hooks $d$. The frame is attached to the vehicle by engaging the hooks $d$ with the upper edge of the side of the body A and passing screws through the lugs $b$ into the body A. The upper ends of the vertical bars of the frame B have their front edges connected by a board, $B^2$, in which is pivoted an elbow-lever, C. The long arm of this lever works between the board B and offsets in the edges of the side bars of the frame, and it may be readily operated by a person either in the wagon or on the ground.

The short arm of the lever C carries a friction-roller, $d'$, which works in a horizontal slot, $e$, in a cross-bar, E, which connects the upper ends of two vertical bars, G, arranged to work between the vertical bars of the frame B and close against the inner surfaces thereof.

The ends of the bar E are provided with trunnions $f$, which work in vertical slots $s$ in the side bars of the frame B, and said trunnions also pass through the upper ends of the bars G, so that said bars may swing on said trunnions. The lower ends of the bars G are provided with curved extensions $g$, the ends of which are pivoted to a frame, H, the upper end of which is pivoted to the lower ends of the vertical bars of the frame B. The frame H is provided with steps $h$, of which there may be any suitable number. As here shown there are two, which is deemed sufficient for illustration.

The frame B being attached to the vehicle-body A, when the lever C is moved in a direction toward the right-hand side of the drawings, the step-frame H is lowered to the position shown in Figs. 1 and 3, so as to place the steps $h$ in position for a person to enter or leave the vehicle. When the lever C is moved in the opposite direction the step-frame swings up and is folded in the frame B, so as to be out of the way when not in use.

Having thus described my invention, what I claim as new, and desire to secure by Letters Patent, is—

1. The combination, with the frame B and connecting-board $B^2$, of the lever C, slotted bar E, and vertical bars G, substantially as and for the purpose herein described.

2. The bars G, provided with the curved extensions $g$, in combination with a step-frame, H, substantially as and for the purpose herein described.

3. The step-frame H, provided with the steps $h$, in combination with the frame B and the vertical bars G, operated by the lever C, and slotted bar E, substantially as and for the purpose herein described.

HENRY F. W. KOEHLER.

Witnesses:
FREDERICK HORNKOHL,
ELIAS M. WATSON.